Feb. 22, 1966  F. BARANOWSKI, JR  3,237,143
SLIDEWIRE DEVICE
Filed Sept. 5, 1963
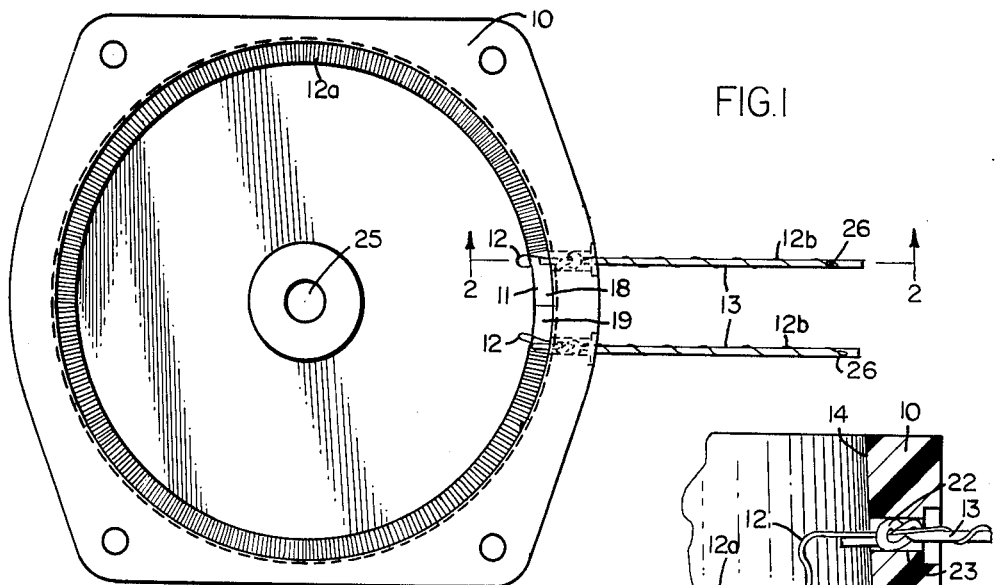
FIG.1
FIG.2
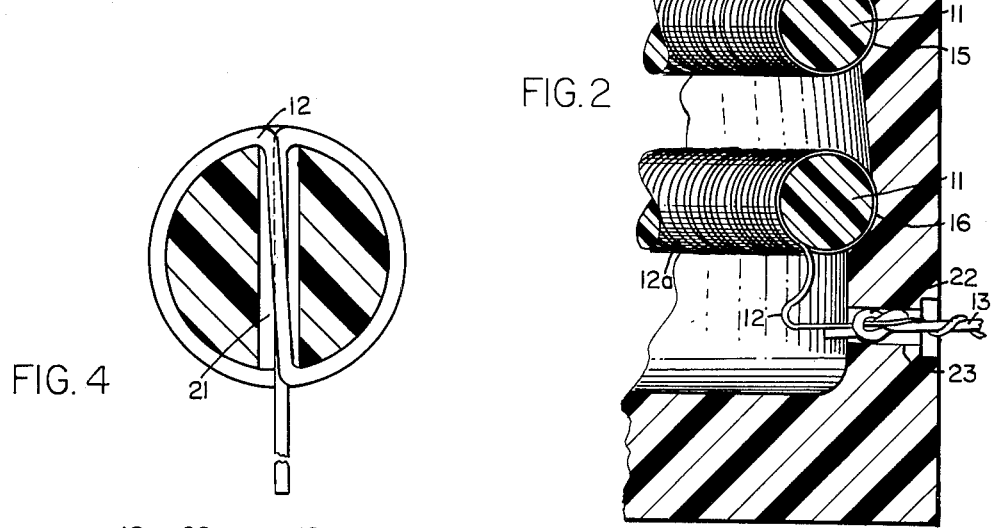
FIG.4
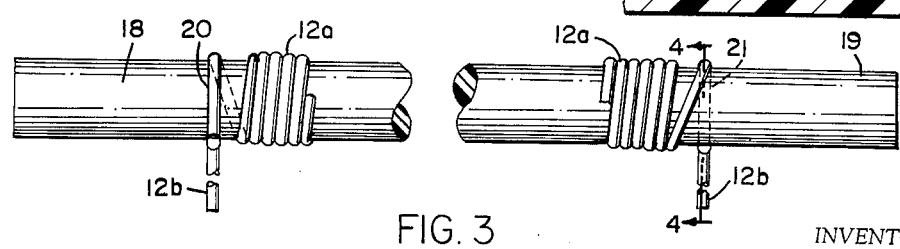
FIG.3
INVENTOR.
FRANK BARANOWSKI JR.
BY
W. J. Shanley, Jr.
HIS ATTORNEY

United States Patent Office 3,237,143
Patented Feb. 22, 1966

3,237,143
SLIDEWIRE DEVICE
Frank Baranowski, Jr., Lynnfield Center, Mass., assignor to General Electric Company, a corporation of New York
Filed Sept. 5, 1963, Ser. No. 306,880
11 Claims. (Cl. 338—315)

This invention relates to improvements in recording apparatus and process controlling apparatus, and more particularly to a new and improved slidewire device useful in recorders and controllers. In both such devices slidewires are utilized to measure a variable condition and convert it into electrical quantities by rebalancing an electrical network which has been unbalanced by the variable condition being measured. Rebalancing is normally accomplished by driving the slider of the potentiometer to a position which will rebalance the network. The position of the slider, which represents the unknown variable, may then be utilized to develop a control signal which is proportional to the unknown variable. When such devices are utilized to generate input signals for electronic controllers, it can be seen that they constitute the very heart of the control system.

The trend in the process control field towards utilizing the inherently more accurate electronic controller, as distinguished from the pneumatic or other types of controllers, has placed new emphasis upon the improvement of slidewire devices since, in many circumstances, the utilization of these electromechanical slidewire devices in combination with all-electronic controllers has evidenced glaring deficiencies in the prior art type of slidewire devices. These deficiencies are evidenced by poor accuracy, poor reliability, high cost, and difficulty in servicing.

One of the major prior art problems with respect to the accuracy of slidewires relates to the difficulty in obtaining a linear relationship between the resistance of the device as plotted against the position of the slider. Any deviation of the slidewire from the straight-line relationship results in introducing errors into the generated control signals. Such a deviation in circular slidewires is the result of the deviation of the slidewire from perfect concentricity with respect to the pivot point of the slider. The lack of concentricity arises primarily due to the presence of kinks in the slidewire since the housing surface that normally supports the slidewire is usually concentric with respect to the pivot point of the slider. This out-of-round condition has also been found to result, not only from the presence of kinks which occur during manufacture, but also as a result of differential thermal expansion between the housing and the slidewire which results in the loosening of the slidewire during usage.

It is therefore an object of this invention to provide a slidewire design of improved accuracy by effectively eliminating the occurrence of kinks in the slidewire during its manufacture and the loosening of the slidewire during usage of a result of differential thermal expansion.

The reliability of prior art devices has been found to be adversely affected by the previously noted loosening of the slidewires, as well as by the shorting of the slidewires to the metallic mandrels which have heretofore been utilized. Shorts frequently developed since the insulation on the mandrel was usually quite thin and ultimately ruptured during usage. Furthermore, the electrical connections to the slidewire were found to be unreliable since open circuits and high resistance connections developed during the usage of such slidewires. The difficulties with respect to shorts and the reliability of the connections to the slidewire could usually be traced to the soldering operation in which the ends of the helical winding were soldered together to anchor the winding upon the mandrel since connections to the slidewire were also obtained during the soldering operation by bringing terminal wires into contact with the ends of the winding. Thus, the technique of utilizing a soldering operation to both anchor the slidewire on the mandrel and obtain electrical connections has been found to adversely affect the reliability of the resulting slidewire and also increase its cost. Furthermore, it was found to be extremely difficult to consistently provide slidewire devices in which the total resistance between the ends of the resistance wire were kept within a desired tolerance since it has been found to be extremely difficult to control the area covered by the solder at the ends of the winding. This may easily be appreciated when it is considered that the resistance wire which is wound upon the mandrel is only a few thousandths of an inch in diameter and thus a very small change in the size of the drop of molten solder will easily change the number of turns at the end of the winding which are shorted out by the solder. The best total-resistance tolerance figures heretofore obtainable when manufacturing such slidewires, in accordance with best soldering techniques presently available, was of the order of ±5%.

It is therefore an object of this invention to provide a slidewire design of improved reliability and lower cost by dispensing with the necessity of soldering the terminal windings of the resistance wire upon the mandrel.

The replacement of damaged, worn or loose slidewires in prior art slidewires has been found to be an expensive operation since the entire slidewire assembly; i.e., the slidewire, the mandrel, and the housing normally have to be scrapped due to the fact that the mandrel and slidewire are pinned or clamped to the housing as well as being soldered to terminals which are in turn secured to the housing. Consequently, it has proved to be difficult to electrically and mechanically disconnect the slidewire from its housing so as to permit the substitution of a new slidewire.

It is therefore an object of this invention to provide a new and improved slidewire design in which the slidewire may be easily disconnected, both electrically and mechanically, from the housing and terminals thus facilitating the replacement of worm slidewires without scrapping the entire assembly.

In accordance with this invention, a slidewire device of improved accuracy is obtained by utilizing identical thermoplastic resins, not only for the slidewire housing, but also for the mandrel upon which the resistance wire is wound. It is an important feature of this invention that the mandrel and slidewire be held in a fixed position with respect to the housing without necessitating the use of pins or clamps by snapping the slidewire into a groove in the inner peripheral surface of the housing, the length of the mandrel being selected so that it is in compression when within the groove. Thus, the mandrel and slidewire are retained within the groove in the housing solely due to the forces exerted upon the mandrel and housing when the mandrel is seated within the groove. This assures that the mandrel, and thus the slidewire, will be tightly held by the housing throughout its temperature operating range since the mandrel and the housing, being of the same material, will have the same coefficients of thermal expansion.

It is another feature of this invention to form the mandrel of an insulating material so as to eliminate the previously noted shorts while facilitating a technique for obtaining more reliable electrical connections to the resistance wire winding. The utilization of insulating materials for the mandrel permits the mechanical anchoring of the opposed ends of the winding to the mandrel instead of necessitating the soldering operation heretofore practiced. Tying down the ends of the winding is effectuated by drilling a hole in each end of the mandrel and tying the resistance wire to the mandrel through each hole. Provisions are also made for permitting the resistance wire to extend outwardly through a hole in the housing so that electrical connections to the resistance wire may be made external to the housing.

It is another important feature of this invention that the terminal wires, to which the resistance wires are electrically connected at points external to the housing, are physically connected to the housing by forcing an enlarged portion of each terminal wire into an aperture in the housing, the apertures being of such a size as to tightly grip the enlarged portion thus mechanically securing the terminal wires to the housing. This configuration permits the establishment of the electrical connections at points external to the housing thus permitting the brazing or welding of the resistance wire to the terminal wires. Welding at a point external to the housing is highly advantageous since the mandrel and the housing need no longer be subjected to excessively high temperatures and, more importantly, it permits more accurate control of the terminal-to-terminal total resistance of the resistance wire.

The thermoplastic resins selected should have the strength and resilience necessary to assure that the housing will be able to retain the mandrel and terminal wires in the positions in which they were originally placed. Furthermore, the resin selected should have the dimensional stability and toughness required to maintain the desired linearity and accuracy during usage. The following thermoplastic resins have been found to be suitable: the acetal resin sold under the trademark Delrin by E. I. du Pont de Nemours & Co. and the polycarbonate resin sold under the trademark Lexan by General Electric Company. The latter has been found to be especially desirable where higher temperature applications are anticipated.

These and other objects and advantages will become apparent from the following description when taken with the accompanying drawing illustrating the invention. The drawing is for the purpose of illustration and is not to be construed as defining the scope or limits of the invention, reference being had for the latter purpose to the appended claims.

In the drawing:

FIG. 1 is a plan view of the housing with slideware and mandrel seated in place in the housing;

FIG. 2 is a sectional view of the peripheral portion of the housing taken along the line 2—2 of FIG. 1 and drawn to an enlarged scale for the purposes of clarity;

FIG. 3 is a view of the mandrel with the resistance wire wound thereon to form the mandrel-slidewire assembly; and FIG. 4 is a sectional view taken along line 4—4 of FIG. 3 illustrating the manner of tying down the ends of the resistance wire winding.

FIG. 1 shows the form of my improved slidewire as comprising a housing 10, a mandrel 11 carrying helically wound resistance wire 12, and terminal wires 13. The inner peripheral surface 14 of housing 10 is illustrated as having grooves 15 and 16 which are provided for receiving completed mandrel-slidewire assemblies (see FIGS. 3 and 4) which may be snapped into the position illustrated in FIG. 1 by placing opposed ends 18 and 19 in abutting coaxial relationship in the desired groove in surface 14. The remainder of the mandrel-slidewire assembly may then be forced into the desired groove by grasing it at points remote from ends 18 and 19 and forcing it downwardly into housing 10 until it snaps into the groove. Once it is snapped into the groove it will remain in this position since the length of each mandrel is selected so that each mandrel-slidewire assembly will be firmly held by housing 10 due to the compression exerted upon these assemblies when they are seated in their intended groove in the housing.

The manner of forming a completed mandrel-slidewire assembly will be described with reference to FIGS. 3 and 4. Apertures 20 and 21 in mandrel 11 are provided to assist in securing the ends of the wound portion 12a of wire 12 to mandrel 11. The opposed ends of wound portion 12a, which may be wound in accordance with well known techniques, are illustrated as being tied off by passing wire 12 downwardly through the aperture and thence upwardly around the back side of the mandrel (as viewed in FIG. 3). Wire 12 is then brought downwardly through both apertures again between the wire and the last remaining turn of wound portion 12a. In accordance with this technique, the ends of wound portion 12a are very simply, yet very effectively, maintained in their illustrated positions without resorting to the soldering of the ends of wound portion 12a as heretofore practiced.

Provisions are made for establishing electrical connections to wound portion 12a of wire 12 once the mandrel-slidewire assemblies are in the positions illustrated in FIGS. 1 and 2 by providing terminal wires 13 which are mechanically anchored to housing 10 and electrically connected to resistance wire 12. These terminal wires are held in the position illustrated in FIG. 2 by embedding knots 22 in apertures or openings 23 to thus provide means for mechanically connecting terminal wires 13 to housing 10. Electrical connections are made between terminal wires 13 and resistance wire 12 by welding or brazing portions 12b of wire 12 to the terminal wires at points 26. Terminal portions 12b are brought out of housing 10 through the center of knots 22. This is accomplished by initially threading each terminal portion 12b through the corresponding knot 22 while leaving enough slack in wire 12 so as not to stress wire 12 during the next assembly step in which both terminal wire 13 and portion 12b are threaded outwardly through aperture 23 until the leading edge of knot 22 comes in contact with the inner edges of the aperture. The end of the terminal wire 13 is then firmly grasped and pulled until knot 22 is firmly held by housing 10 by compression forces in the position illustrated in FIG. 2. This provides a firm mechanical connection to housing 10 since the housing will resiliently hold knot 22 and thus will anchor terminal wire 13. It will be noticed that the feeding of wire 12 through the center of knot 22 protects it so that it will not be cut or otherwise weakened by being pinched between wire 13 and the inner surface of aperture 23.

A few turns of terminal section 12b of resistance wire 12 may then be wrapped around terminal wires 13 for a short distance, for example, about ⅝ of an inch, and then be brazed or welded at point 26 to anchor it to terminal wire 13. This permits the temporary attachment of a heat sink to terminal wire 13 between point 26 and housing 10 to prevent the application of high temperatures to housing 10 and mandrel 11. It will be noticed that the total resistance from terminal to terminal is equal to the resistance of wire 12 between the apertures 23 since portions 12b are shorted between knot 22 and point 26. This facilitates close control of the total resistance of the slidewire.

Wiper arms, which cooperate with wound portions 12a of the slidewires, have not been illustrated since they form no part of my invention. Wipers may be conventionally supported to rotate about center aperture 25 of housing 10 so as to be in contact with the surface of the corresponding wound portion of wire 12.

Slidewire devices, in accordance with my invention, have been constructed on a production line basis while maintaining the linearity to within ±.10% of straight line linearity, the terminal-to-terminal resistance values being held to better than ±2% of the desired resistance. Housing 10 and mandrels 11 of such devices were formed of Delrin acetal resin. The mandrels were wound with 37 gauge low temperature coefficient resistance wire. It has been found that .020″ Grade A nickel wire is strong enough to use as terminal wire since it is strong enough to withstand the force necessary to embed knot 22 in apertures 23.

It can be seen that the removal of a damaged slidewire merely requires the cutting of the resistance wire at the loop formed between wound portion 12a and terminal portion 12b. This permits the ejection of the damaged slidewire-mandrel assembly from its groove and the removal of the associated terminal wires. A new mandrel-slidewire assembly may then be substituted in housing 10 along with new terminal wires in the manner previously described.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. A slidewire device comprising the combination of a housing having a generally cylindrical inner peripheral surface with a groove formed therein, and a mandrel carrying a helically wound resistance wire thereon, said mandrel and said housing being formed of a thermoplastic resin, said mandrel being seated in said groove and being of such a length as to be retained therein due to the compressional forces exerted on said mandrel after it has been snapped into said groove, said mandrel having first and second apertures therein, the portions of the resistance wire which forms the ends of the wound portion of the resistance wire passing through said first and second apertures at least once to anchor the ends of the wound portion of the resistance wire.

2. A slidewire device comprising the combination of a housing having a generally cylindrical inner peripheral surface with a groove formed therein, and a mandrel carrying a helically wound resistance wire thereon, said resistance wire having a wound portion and first and second terminal portions, said mandrel and said housing being formed of a thermoplastic resin, said mandrel being seated in said groove and being of such a length as to be retained therein due to the compressional forces exerted on said mandrel after it has been snapped into said groove, said mandrel having first and second apertures therein, the portions of the resistance wire which forms the ends of the wound portion of the resistance wire passing through said first and second aperture at least once to anchor said ends, said housing having first and second apertures therein for receiving said first and second terminal portions, respectively, to render them accessible at points outside of said housing.

3. The combination of claim 2 further comprising first and second terminal wires, said terminal wires and said housing apertures being shaped so that said terminal wires are held in a fixed position with respect to the housing after they have been inserted into their corresponding housing aperture.

4. The combination of claim 3 in which the shapes of said terminal wires and housing apertures are such that a portion of each of said terminal wires is held in compression by said housing when it is inserted in its corresponding housing aperture.

5. The combination of claim 4 in which said portions are enlarged beyond the size of the remaining portions of said terminal wires, said enlarged portions being in proximity to one end thereof, said housing apertures having a substantially constant cross-sectional area throughout a substantial part of its length, each of said enlarged portions being larger in cross-section than the cross-section of the corresponding housing apertures whereby the terminal wires are held in compression by said housing.

6. The combination of claim 5 in which said enlarged portions each comprises a knot in said terminal wires, said knots each being larger in at least one cross-sectional dimension than the corresponding housing aperture so as to provide the required compression.

7. The combination of claim 6 in which said resistance wire is small enough to pass through the center of both of said knots when traversing said housing apertures.

8. The combination of claim 7 in which said first and second resistance wires are electrically connected to said first and second terminal wires, respectively, at points removed from the points at which the wires emerge from said housing apertures.

9. The combination of claim 8 in which said thermoplastic resin is an acetal resin and said terminal wires are composed primarily of nickel.

10. An electrical device comprising a housing formed of resilient material and having an opening in a wall thereof, a resistance element mounted within said housing having a resistance wire an end of which extends through said opening outside said housing, a terminal wire mounted in said opening and extending outside said housing, said terminal wire having an enlarged portion formed by a knot therein dimensioned relative to the size of said opening so as to be anchored to said housing by compression when said knot is drawn into said opening, and means electrically connecting said resistance and terminal wires.

11. The combination of claim 10 wherein the resistance wire passes through the center of the knot in traversing said opening so as to avoid compression forces between the terminal wire and the housing when the knot is drawn into said opening.

References Cited by the Examiner

UNITED STATES PATENTS

| | | | |
|---|---|---|---|
| 1,473,866 | 11/1923 | Phelps | 338—312 X |
| 2,067,615 | 1/1937 | Metcalf et al. | 336—192 X |
| 2,132,870 | 10/1938 | Geyer | 339—106 X |
| 2,163,716 | 6/1939 | Turner | 29—206 |
| 2,318,485 | 5/1943 | Herman | 339—59 |
| 2,572,069 | 10/1951 | Sparklin | 338—312 X |
| 2,889,529 | 6/1959 | Vacha | 338—174 X |
| 2,976,509 | 3/1961 | McFaddan | 338—329 |
| 3,070,768 | 12/1962 | Mairs | 338—154 |
| 3,076,162 | 1/1963 | Ferrari | 338—167 |
| 3,096,499 | 6/1963 | Hudson et al. | 338—163 |
| 3,127,583 | 3/1964 | Hudson et al. | 338—174 |

FOREIGN PATENTS 927,954  6/1963  Great Britain.

RICHARD M. WOOD, *Primary Examiner.*

V. Y. MAYEWSKY, *Assistant Examiner.*